United States Patent
Beveridge et al.

(10) Patent No.: US 9,626,212 B2
(45) Date of Patent: Apr. 18, 2017

(54) LIVE MIGRATION OF VIRTUAL MACHINES WITH MEMORY STATE SHARING

(71) Applicant: VMware, Inc., Palo Alto, CA (US)

(72) Inventors: Daniel James Beveridge, Apollo Beach, FL (US); Gabriel Tarasuk-Levin, Sunnyvale, CA (US)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 14/587,826

(22) Filed: Dec. 31, 2014

(65) Prior Publication Data

US 2015/0378766 A1 Dec. 31, 2015

Related U.S. Application Data

(60) Provisional application No. 62/041,047, filed on Aug. 23, 2014, provisional application No. 62/018,582, filed on Jun. 28, 2014, provisional application No. 62/018,580, filed on Jun. 28, 2014.

(51) Int. Cl.
*G06F 9/455* (2006.01)
*G06F 17/30* (2006.01)
*G06F 9/48* (2006.01)

(52) U.S. Cl.
CPC ........ *G06F 9/45558* (2013.01); *G06F 9/4856* (2013.01); *G06F 17/30578* (2013.01); *G06F 2009/4557* (2013.01); *G06F 2009/45583* (2013.01)

(58) Field of Classification Search
CPC ....... G06F 9/45558; G06F 2009/45583; G06F 2009/4557

USPC .......................................................... 718/1
See application file for complete search history.

(56) References Cited

U.S. PATENT DOCUMENTS

| | | |
|---|---|---|
| 5,832,484 A | 11/1998 | Sankaran |
| 7,680,919 B2 | 3/2010 | Nelson |
| 8,335,899 B1 | 12/2012 | Meiri |
| 8,407,182 B1 | 3/2013 | Rajaa |
| 8,527,990 B1 | 9/2013 | Marathe |
| 8,875,134 B1 | 10/2014 | van Der Goot |
| 8,954,408 B2 | 2/2015 | Dudgeon |
| 8,966,211 B1 | 2/2015 | Arnon |

(Continued)

OTHER PUBLICATIONS

Jin et al., Live Virtual Machine Migration . . . , 2009, IEEE, pp. 1-10.*

(Continued)

*Primary Examiner* — John Chavis

(57) ABSTRACT

Embodiments described herein rapidly migrate child virtual machines (VM) by leveraging shared memory resources between parent and child VMs. In a first, proactive phase, parent VMs are migrated to a plurality of potential target hosts. In a second, reactive phase, after a request is received to migrate a child VM to a selected target host, memory blocks that are unique to the child VM are migrated to the selected target host. In some examples, memory blocks are compressed and decompressed as needed. In other examples, the operation environment is modified. Aspects of the disclosure offer a high performance, resource efficient solution that outperforms traditional approaches in areas of software compatibility, stability, quality of service control, resource utilization, and more.

20 Claims, 10 Drawing Sheets

(56) References Cited

U.S. PATENT DOCUMENTS

| | | | |
|---|---|---|---|
| 9,043,640 | B1 | 5/2015 | Havemose |
| 9,081,842 | B1 | 7/2015 | Natanzon |
| 9,201,802 | B1 | 12/2015 | Armangau |
| 9,201,887 | B1 | 12/2015 | Earl et al. |
| 9,251,004 | B1 | 2/2016 | Havemose |
| 2004/0047466 | A1 | 3/2004 | Feldman et al. |
| 2005/0289143 | A1 | 12/2005 | Oshri |
| 2007/0168284 | A1 | 7/2007 | Factor et al. |
| 2008/0127182 | A1 | 5/2008 | Newport |
| 2009/0063751 | A1* | 3/2009 | Dow ................. G06F 12/08 711/6 |
| 2010/0064144 | A1 | 3/2010 | Kaabouch et al. |
| 2010/0281273 | A1 | 11/2010 | Lee et al. |
| 2011/0099318 | A1 | 4/2011 | Hudzia |
| 2011/0321041 | A1* | 12/2011 | Bhat ................. G06F 9/4856 718/1 |
| 2012/0233285 | A1 | 9/2012 | Suzuki |
| 2012/0284234 | A1 | 11/2012 | Mashtizadeh |
| 2012/0284707 | A1 | 11/2012 | Janakiraman |
| 2013/0031069 | A1 | 1/2013 | Dudgeon |
| 2013/0042241 | A1 | 2/2013 | Lorenc |
| 2013/0247020 | A1* | 9/2013 | Fontignie ................. G06F 8/63 717/168 |
| 2013/0290661 | A1 | 10/2013 | Reuther |
| 2014/0068127 | A1 | 3/2014 | Baron |
| 2014/0115161 | A1 | 4/2014 | Agarwal |
| 2014/0136803 | A1 | 5/2014 | Qin |
| 2014/0189672 | A1 | 7/2014 | Raundahl |
| 2014/0229697 | A1* | 8/2014 | Colbert ................. G06F 3/0617 711/162 |
| 2014/0282536 | A1 | 9/2014 | Dave |
| 2014/0310800 | A1 | 10/2014 | Kabra |
| 2014/0344395 | A1* | 11/2014 | Alexander ............. H04L 67/34 709/217 |
| 2015/0074453 | A1* | 3/2015 | Fleming ................. G06F 9/455 714/6.23 |
| 2015/0178108 | A1* | 6/2015 | Tarasuk-Levin .... G06F 9/45558 718/1 |
| 2015/0178109 | A1* | 6/2015 | Li ........................ G06F 9/45558 718/1 |
| 2015/0205542 | A1 | 7/2015 | Antony |
| 2015/0212839 | A1 | 7/2015 | Tsirkin |
| 2015/0254424 | A1 | 9/2015 | Zehler |
| 2015/0278041 | A1 | 10/2015 | Ganesan |
| 2015/0370660 | A1 | 12/2015 | Pershin |
| 2015/0378831 | A1 | 12/2015 | Tarasuk-Levin et al. |
| 2016/0055019 | A1 | 2/2016 | Thakkar |
| 2016/0105378 | A1 | 4/2016 | Xia |
| 2016/0110267 | A1 | 4/2016 | Earl et al. |
| 2016/0191332 | A1* | 6/2016 | Markley ................. H04L 67/34 709/223 |
| 2016/0224371 | A1 | 8/2016 | Ramanathan et al. |

OTHER PUBLICATIONS

Chavis, John Q., "Office Action", U.S. Appl. No. 14/588,023, mailed Feb. 2, 2016, 6 pages.

Chavis, John Q., "Office Action", U.S. Appl. No. 14/587,980, mailed Jan. 15, 2016, 8 pages.

Chavis, John Q., "Office Action", U.S. Appl. No. 14/587,980, mailed Jun. 27, 2016, 9 pages.

Chavis, John Q., "Office Action", U.S. Appl. No. 14/752,643, mailed Jul. 5, 2016, 17 pages.

Chavis, John Q., "Notice of Allowance", U.S. Appl. No. 14/752,674, mailed Jul. 20, 2016, 14 pages.

Chavis, John Q., "Office Action", U.S. Appl. No. 14/752,668, mailed Jul. 28, 2016, 14 pages.

Do, Stephen M., "Office Action", U.S. Appl. No. 14/752,652, mailed Sep. 1, 2016, 33 pages.

Hailu, Teshome, "Office Action", U.S. Appl. No. 14/752,635, mailed Oct. 7, 2016, 20 pages.

* cited by examiner

LIVE MIGRATION OF VIRTUAL MACHINES WITH MEMORY STATE SHARING

CROSS-REFERENCE TO RELATED APPLICATIONS

This application claims the benefit of U.S. Provisional Patent Application Ser. No. 62/041,047, filed Aug. 23, 2014 entitled "Live Migration of Virtual Machines with Memory State Sharing", U.S. Provisional Patent Application Ser. No. 62/018,582, filed Jun. 28, 2014 entitled "Live Migration with Pre-Opened Shared Disks", and U.S. Provisional Patent Application Ser. No. 62/018,580, filed Jun. 28, 2014 entitled "Using Active/Active Asynchronous Replicated Storage for Live Migration", all of which are incorporated by reference herein in their entireties.

This application is related to U.S. Non-Provisional Patent Applications entitled "Using Active/Active Asynchronous Replicated Storage for Live Migration" and "Live Migration with Pre-Opened Shared Disks", filed concurrently herewith, both of which are incorporated by reference herein in their entireties.

BACKGROUND

Live migration programs, such as with vMotion from VMware, Inc., migrate a memory image of a source virtual machine (VM) to a target VM. In some instances, the migration is implemented while the parent VM is being executed and, thus, while memory pages are being modified. A set of synchronization cycles enable the source and target VMs to 'catch-up' to each other.

Some known live migration techniques anticipate only one target VM and migrate the entirety of the source VM upon receipt of the request for migration. This technique restricts users or software from selecting target hosts based on dynamic conditions at the time of migration. Moreover, migrating the entirety of the source VM may be costly in terms of bandwidth and resources over long distances.

SUMMARY

Examples of the present disclosure facilitate rapid migration of virtual machines (VMs). The present disclosure transfers memory blocks from a parent VM to a plurality of target hosts before a request for migration is received. Upon receiving a request to migrate a child VM, memory blocks that are unique to the child VM are migrated to a selected target host.

This summary introduces a selection of concepts in a simplified form that are described in more detail below. This summary is not intended to identify essential features, nor is it to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Aspects of the disclosure contemplate a hot cloning technology that enables virtual machines (VMs) to be created rapidly using a 'forking' process whereby a parent VM suspended in memory is used as a memory template for creation of child VMs. The child VMs initially share all memory pages but start to build up a set of their own unique pages based on their activity. The memory pages of the parent VM are shared ahead of time with each target host to which a child VM might need to migrate. When moving the child VM, only the unique memory pages are transferred rather than all the memory pages. The unique memory pages may represent only a fraction of all the memory pages and they may be further compressed on the fly for further reductions of approximately 50%. The unique memory pages are logically rebound to the parent VM on the target host, and the VM starts executing. The pages that were transferred compressed may be decompressed on demand by the hypervisor during the initial post migration phase and decompression continues in the background at a controlled rate to avoid sustained performance impact.

By lowering the cost of long-distance live migration operations in this manner, global migrations are enabled based on changing resource costs and workload requirements. New revenue models are further contemplated, whereby small charges are levied for policy driven migrations that reduce the ongoing cost of VM execution. In summary, forking-based live migration transfers a one VM from one location to another within the emerging hybrid-cloud architecture.

While described with reference to a particular type of forking as described herein, referred to as VMFork by VMware, Inc., in some examples, those skilled in the art will note that any infrastructure, operations, components, and/or configuration of hardware, software, and/or firmware implementing the operations (or their equivalents or variations) described herein are within the scope of the disclosure.

It is also understood that although some examples describe migration of a specific child VM, any child VM forked from the original parent VM template may be migrated in the manner described below.

Examples of the disclosure leverage the memory state inheritance aspect of VMFork for migration purposes by pre-migrating memory blocks which are shared by a child VM with a parent VM to multiple target hosts. A copy of at least some portions of a parent VM template is created on each of the target hosts. Once a target host is selected, the remaining, unshared memory blocks, of the child VM are migrated to the target host. This results in faster migration, reduced bandwidth utilization, reduced downtime, reduced CPU cycles, reduced I/O storage consumption, and maximized memory sharing.

An example of a virtualized environment is next described.

Figure 1:
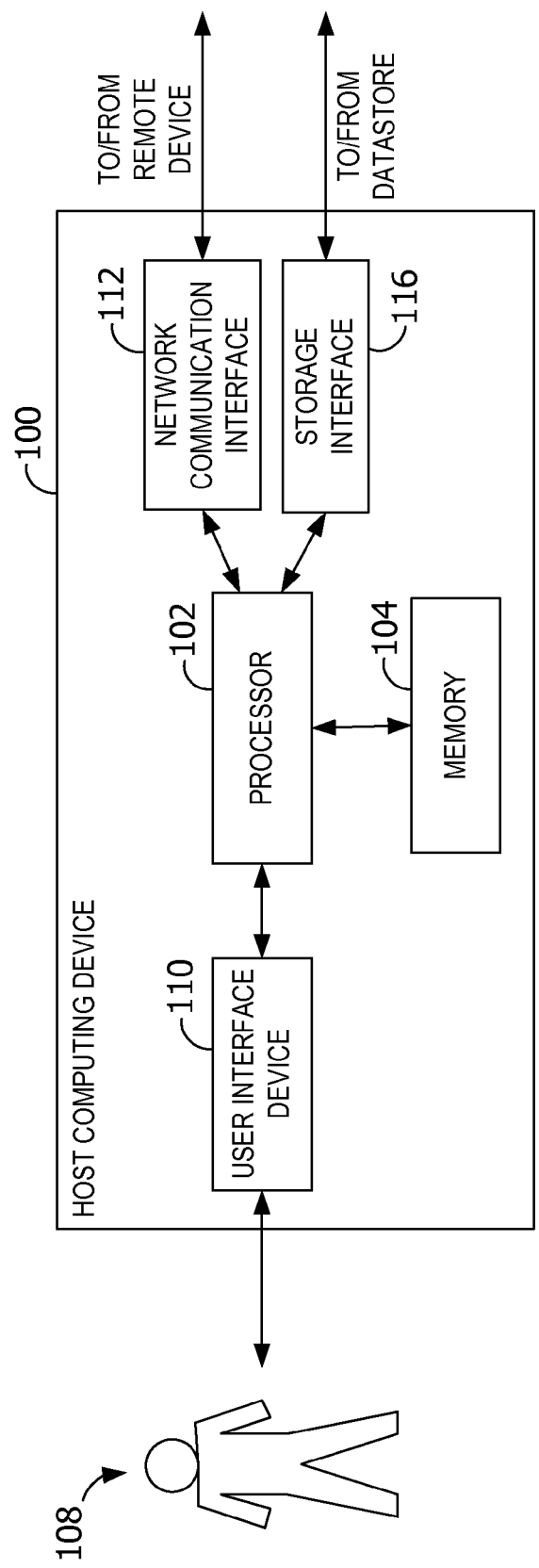
FIG. 1 is a block diagram of an example host computing device.

FIG. 1 is a block diagram of an example host computing device 100. Host computing device 100 includes a processor 102 for executing instructions. In some examples, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid state disks, and/or optical disks. In FIG. 1, memory 104 refers to memory and/or storage. However, in some examples, memory 104 may refer only to memory in host computing device 100, and exclude storage units such as disk drives and hard drives. Other definitions of memory are contemplated.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 110 operates to receive data from user 108, while another device (e.g., a presentation device) operates to present data to user 108. In other examples, user interface device 110 has a single component, such as a touch screen, that functions to both output data to user 108 and receive data from user 108. In such examples, user interface device 110 operates as a presentation device for presenting information to user 108. In such examples, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some examples, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In some examples, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
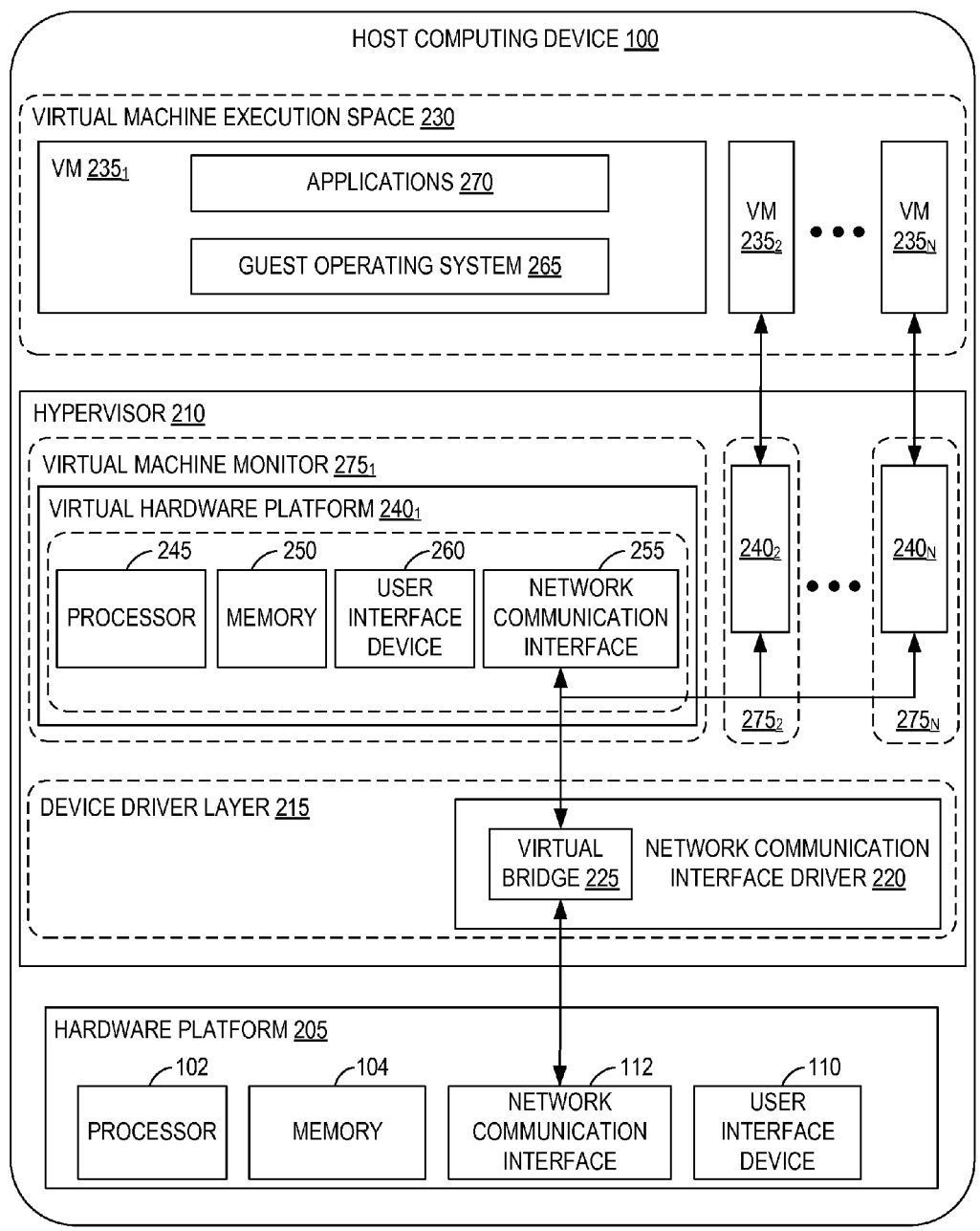
FIG. 2 is a block diagram of example virtual machines that are instantiated on a computing device, such as the host computing device shown in FIG. 1.

FIG. 2 depicts a block diagram of virtual machines $235_1$, $235_2 \ldots 235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106. A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some examples, memory 250 in first virtual hardware platform $240_1$ includes a virtual disk that is associated with or "mapped to" one or more virtual disk images stored on a disk (e.g., a hard disk or solid state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an example, network communication interface 112 is an Ethernet adapter that is configured in "promiscuous mode" such that Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Aspects of the disclosure are operable with any computer architecture, including non-x86-compatible processor structures such as those from Acorn RISC (reduced instruction set computing) Machines (ARM), and operating systems other than those identified herein as examples.

Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an example of the disclosure is included as a component in VMware's ESX brand software, which is commercially available from VMware, Inc.

The host computing device 100 may include any computing device or processing unit. For example, the computing device 100 may represent a group of processing units or other computing devices, such as in a cloud computing configuration. The computing device 100 has at least one processor 102 and a memory 104. The processor 102 includes any quantity of processing units, and is programmed to execute computer-executable instructions for implementing aspects of the disclosure. The instructions may be performed by the processor 102 or by multiple processors executing within the computing device 100, or performed by a processor 102 external to computing device 100. In some examples, the processor 102 is programmed to execute instructions such as those illustrated in the figures.

The memory 104 includes any quantity of computer-readable media associated with or accessible by the computing device 100. The memory 104, or portions thereof, may be internal to the computing device 100, external to computing device 100, or both.

Figure 3:
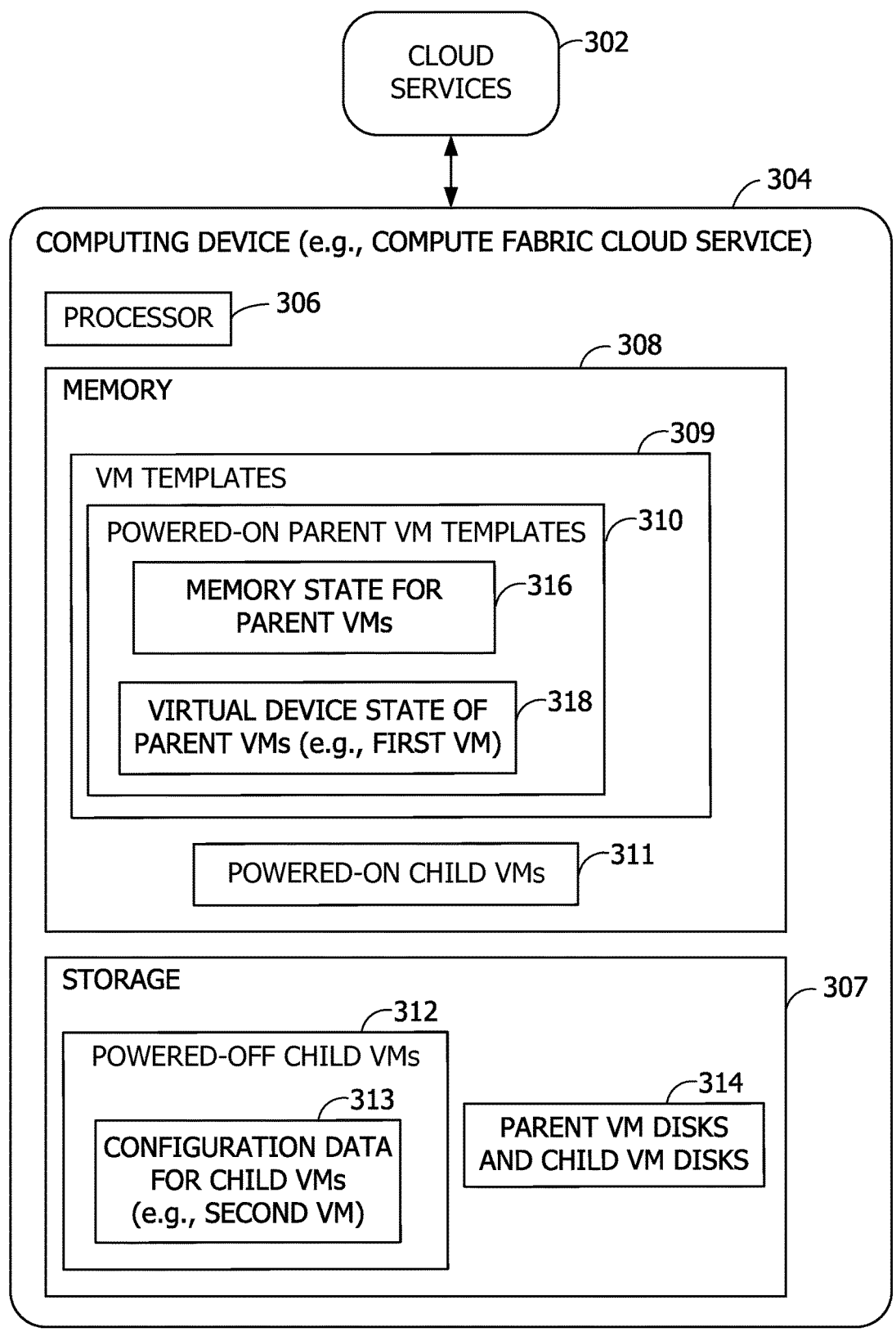
FIG. 3 is a block diagram of an example system with parent VM templates and child VMs.

FIG. 3 is a block diagram of an example system that utilizes cloud services to create, store, and retrieve child VMs. In the example of FIG. 3, a computing device 304 is in communication with cloud services 302. The computing device 304 includes a processor 306, memory 308, and storage 307.

The memory 308 stores a plurality of VM templates 309. In some examples, VM templates 309 are arranged in a hierarchy, such as a tree hierarchy. However, aspects of the disclosure are operable with VM templates 309 stored in any structure. In such examples, VM templates 309 include a plurality of powered-on parent VM templates 310. The powered-on parent VM templates 310 may be created and maintained by the computing fabric cloud service and/or by cloud services 302, or by any other computing device 304. The parent VM templates 310 may be classified, categorized, or otherwise described as derived VM templates and standalone VM templates. Derived VM templates are derived from one of the parent VM templates 310, and inherit one or more disk blocks (e.g., "common" disk blocks) from that corresponding parent VM template 310. The standalone VM templates lack any such inherited disk block from parent VM templates 310. Aspects of the disclosure are operable with any form of disk block inheritance, such as via a redo log, array-level snapshots (e.g., using block reference counting), etc.

In some examples, each parent VM template 310 includes a virtual device state 318 for one of VMs 235 (shown in FIG. 2) and a memory state 316 for that VM 235. In some examples, one or more powered-on parent VMs templates 310 include pre-launched applications published by the processor 306 and/or the hypervisor 210 (shown in FIG. 2). In one example, the hypervisor 210 brings memory and/or code pages into memory 308 to publish the applications 270. The applications 270 are locked in memory 308 by any means known, including memory page stuffing.

Memory 308 further stores data describing a plurality of powered-on child VMs 311. A powered-on child VM 311 is instantiated from one of parent VM templates 310 using, for example, a powerOnChildren( ) function call. The powerOnChildren( ) function call leverages fast VM 235 instantiation techniques, such as those as described herein, to quickly spawn VMs 235 with minimal processor overhead. The powered-on child VM 311 shares one or more memory pages with an associated parent VM. The powered-on child VM 311 is entered into memory 308 and any modification and/or change of the child VMs 311 is entered into memory 308 as COW. The powered-on child VMs 311 may also be powered off or reset using the powerOffChildren( ) function call and the powerResetChildren( ) function call, respectively.

When powered off, the powered-on child VM 311 becomes a powered-off child VM 312. Storage 307 stores data describing a plurality of powered-off child VMs 312. A powered-off child VM 312 is instantiated, on demand, from a parent VM template 310.

Child VMs 311 and/or 312 are registered (e.g., to a cloud operating system, or other management logic). The cloud operating system is executed by the computing device 304. Registration of one of child VMs 311 and/or 312 includes identifying child VMs 311 and/or 312 to the cloud operating system, and occurs, in some examples, before powered-off child VM 312 is powered-on or otherwise executed. In this manner, powered-off child VM 312 is said to be pre-registered with the cloud operating system. In other examples, the child VM 311 and/or 312 is registered after powering on. In some examples, the cloud operating system is the hypervisor 210. By registering powered-off child VMs 312, the cloud operating system is no longer in the critical path when cloud services 302 commission VMs 235, thus reducing the amount of time needed for child VMs to become available. However, aspects of the disclosure are also operable with registration occurring on the child VM 311 and/or 312 instantiation path.

Child VMs 311 and/or 312 have one or more properties, characteristics, or data associated therewith. In some examples, the child VM properties for each child VM (e.g., second VM) may be referred to as configuration data 313. In some examples, configuration data 313 for the child VM 311 and/or 312 is defined, created, received, and/or registered prior to receiving a request to fork the child VM (e.g., from a management level application). In other examples, configuration data 313 is defined in response to receiving the request to fork the child VM 311 and/or 312. Configuration data 313 may be defined from default values set by an administrator, received in the request from the management level application, and/or populated with data from other sources. Example configuration data 313 for the child VM 311 and/or 312 includes an Internet Protocol (IP) address, a MAC address, a hostname, a domain identity, a processor size, memory size, a set of attributes, and/or any other state data to be applied when customizing the identity of the child VM 311 and/or 312. In some examples, configuration data 313 is stored in a file such as a .vmx file, with one file per child VM 311 and/or 312. Configuration data 313 may be registered with virtualization software, such as the cloud operating system.

In some examples, cloud service 302 specifies whether to create a standalone template or a derived VM template (e.g., from another parent VM template 310). For example, cloud service 302 creates a defined quantity of registered (e.g., to a cloud operating system) but powered-off child VMs 312 using the createChildren( ) function call. The createChildren( ) function call also takes as input a childProperties argument which defines, for example, the identities (e.g., hostname, IP/MAC address, etc.) and particular processor and/or memory sizes of the child VMs 312. If the sizes are different from that of an existing parent VM template 310, the computing fabric cloud service may either add those resources when powering on a powered-off child VM 312 such that the powered-off child VM 312 becomes a powered-on child VM 311 (e.g., a "hot add") or create a new parent VM template 310 having the desired resources and creating a new child VM 311 from the new parent VM template 310. In addition, the childProperties argument also specifies how the child VM 311 and/or 312 behaves when powered-on and/or reset. For example, the child VM 311 and/or 312 may act as an ephemeral entity that returns to a parent state, or a regular VM 235 that goes through a usual boot process.

In some examples, the computing device 304 defines a virtual device state of the child VM 311 and/or 312 based on virtual device state 318 of the parent VM. For example, defining the virtual device state of the child VM 311 and/or 312 includes copying virtual device state 318 from the powered-on parent VM templates 310. As another example, defining the virtual device state of the child VM 311 and/or 312 includes creating a COW delta disk referencing virtual device state 318 of the parent VM. Alternatively, the virtual device state of the child VM 311 and/or 312 depends, for example, on user criteria, the system capabilities or the applications the child VM 311 is running.

The computing device 304, in some examples, defines, creates, receives, and/or registers persistent storage for the child VM 311 and/or 312 based on persistent storage (.vmdk) of the powered-on parent VM templates 310. In some examples, persistent storage for the child VM 311 and/or 312 is stored in a file, such as a .vmdk file. For example, defining the persistent storage for the child VM 311 and/or 312 includes referencing persistent storage 307 and/or disk 314 of the parent VM. In some examples, referencing persistent storage 307 and/or disk 314 of the parent VM includes creating a read-only base disk referencing persistent storage 307 and/or disk 314 of the parent VM, and creating a COW delta disk (associated with the child VM) to store changes made by the child VM 311 and/or 312 to the base disk.

In some examples, computing device 304 defines, creates, receives, and/or registers memory 308 for the child VM 311 and/or 312 based on memory state 316 of the parent VM. In some examples, referencing memory state 316 of the parent VM includes creating COW memory (associated with the child VM 311) to store changes made by the child VM 311 and/or 312 to memory state 316 of the parent VM. In this manner, the child VM 311 and/or 312 shares memory state 316 of the parent VM with COW memory pages, in contrast with linked clones that use COW delta disks.

The computing device 304 executes (e.g., powers on) the powered-off child VM 312, which becomes powered-on child VM 311. Execution of the powered-off child VM 312 includes configuring an identity of child VM 311 and/or 312 using configuration data 313. In some examples, execution of the powered-off child VM 312 includes configuration and execution of a boot process (or bootup process) to access and apply configuration data 313 to the powered-on child VM 311. In this manner, the powered-on child VM 311 customizes itself during bootup. The now-executing powered-on child VM 311 has a virtual device state that is a copy of virtual device state 318 of the parent VM, with persistent storage referencing persistent storage 307 and/or disk 314 of the parent VM.

In some examples, the bootup process is executed by a guest operating system on the powered-on child VM 311. The bootup process includes, for example, a command to perform a synchronous remote procedure call (RPC) to the cloud operating system to obtain and apply configuration data 313. An example format for the RPC is "rpc 'info-get'".

The powered-on child VM 311 (or simply child VM), also known as the forked VM, may be configured in different ways, dependent in part on a type of guest operating system executing on child VM 311 and/or 312. One example for configuring an identity of child VM 311 and/or 312 is next described.

In some examples of the disclosure, the boot process applies customization to the child VM 311 and/or 312. The boot process includes a blocking agent that prevents the powered-off child VM 312 from completing bootup until certain operations have completed. For example, the blocking agent is injected into the boot process to prevent the guest operating system on the powered-on child VM 311 from accepting user-level commands until the identity of the powered-on child VM 311 has been configured.

The child VM 311 and/or 312, in some examples, accesses configuration data 313 that specifies a domain identity to be applied to the child VM 311 and/or 312. The domain identity is one of a plurality or pool of previously created domain identities available to the child VM 311 and/or 312. The plurality of domain identities are created, for example, by an administrator before the virtual device state of the child VM 311 and the persistent storage 307 and/or disk 314 of the parent VM are defined.

The domain identity is pre-selected (e.g., explicitly identified in configuration data 313) in some examples, or selected during execution of the bootup process (e.g., based on characteristics of executing powered-on child VM 311). The specified domain identity is from the pool of previously created identities. Then the obtained domain identity is applied to the powered-on child VM 311. In some examples, applying the obtained domain identity includes performing an offline domain join operation, or any method that allows a computer system to join a domain without a reboot.

In operation, preparing the powered-on parent VM template 310 for forking may be performed, for example, by a guest agent residing inside a guest operating system of the powered-on parent VM template 310. The guest agent issues a fork command to quiesce the powered-on parent VM template 310 into the ready-to-fork state at an appropriate boot stage. As provisioning operations are initiated, the one or more powered-off child VMs 312 are forked without a committed identity. As the boot process begins inside each powered-on child VM 311, the various identities are applied to each powered-on child VM 311. For example, due to the forking process as described herein, a copy of the guest agent from the powered-on parent VM template 310 appears in each powered-on child VM 311. The copy of the guest agent resumes execution inside each powered-on child VM 311 as part of the boot process of the guest operating system. In this post-fork stage, for each powered-on child VM 311, the guest agent obtains (e.g., from a data store available to the guest operating system of the powered-on child VM 311) and applies one or more identities to the powered-on child VM 311. For example, the identities, or other parameters are stored as part of configuration data 313 in a .vmx file, or other file stored by the cloud operating system and accessible via API from within the guest operating system. In operation, the guest operating system synchronously requests and receives one of the identities from the cloud operating system to perform an offline domain join (e.g., update the identity in place) before proceeding through the tail end of the bootup process (e.g., before the system launches the logon service).

The operations discussed above may be embodied as computer-executable instructions stored on one or more computer-readable media. The instructions, when executed by processor 306, configure an identity of a forked VM 235 based on a pool of available domain identities.

The forking and state customization operations illustrated and described may be implemented using templates and an API to configure and deploy the powered-off child VM 312 in response to a request from cloud service 302. In an example, computing device 304 creates and maintains a hierarchy of powered-on parent VM templates 310 and powered-off child VMs 312 which are ready to be executed. Powered-on parent VM templates 310 are created, in some examples, in response to a request from at least one of cloud services 302. Alternatively or in addition, powered-on parent VM templates 310 are created on demand by computing device 304 after detecting patterns in VM 235 provisioning requests from cloud services 302. Maintaining the set of powered-on parent VM templates 310 includes, for example, powering-on each of powered-on parent VM templates 310. Each powered-off child VM 312 is instantiated from one of powered-on parent VM templates 310 in response to a request for the child VM. Maintaining the set of powered-off child VMs 312 includes, for example, pre-registering each instantiated powered-off child VM 312 to the cloud operating system (e.g., before being initiated or otherwise powered-on).

Alternatively or in addition, one or more of cloud services 302 may create and maintain one or more of powered-on parent VM templates 310.

In a teardown phase, parent VM templates 310 and child VMs 311 and/or 312 may be destroyed using function calls such as destroyParentTemplate( ) and destroyChildren( ). Depending on whether parent VM template 310 is part of the template hierarchy (e.g., a derived VM template) or a standalone template, destroying the template may not remove it completely from disk. The destroyChildren( ) function call turns off powered-on child VM 311 (e.g., power down) and resets the child VM 311 and/or 312 properties such as identity, etc.

In an automatic mode, rather than have powered-on parent VM templates 310 be explicitly created via the function calls available in a manual mode, parent VM templates are automatically generated based on demand. For example, cloud service 302 uses a function call such as createChildrenAuto( ) to create child VMs. When a particular type of child VM is requested repeatedly (e.g., a plurality of requests are received for the same type of child VM), computing fabric cloud service creates a new powered-on parent VM template 310, deriving it from the appropriate powered-on parent VM template 310 in the hierarchy. This optimization further simplifies the setup and teardown phases by eliminating the need for cloud services 302 to explicitly create, destroy, and otherwise manage powered-on parent VM templates 310. In some examples, the new powered-on parent VM template 310 is created only if additional requests are expected for such VMs. For example, if the request for a particular VM 235 is a one-off request, the new parent VM template is not created.

VM instantiation operations are performed on VMs 235 stored in one or more datastores. Example VM instantiation operations include, but not limited to, cloning, copying, forking, and the like. VM instantiation operations may be performed by virtualization products such as VMware's ESX brand software (e.g., in a kernel layer). In some examples, VM instantiation operations implement fast-suspend-resume technology with COW page references (e.g., rather than handing over pages entirely). While described in some examples herein with reference to VM forking routines, those of ordinary skill in the art will note that the disclosure is not limited to these VM forking routines. Rather, the disclosure is operable with any fast VM instantiation routines in environments where there are common base images with sharing opportunities across VMs in a cluster. However, the VM forking routines described herein enable the elimination of any pre-flight comparison between the source side parent and the destination side parent, as the VM forking routines confer, on the destination side parent, the same memory state from the source side parent. Aspects of the disclosure enable ease of identification of shared memory versus non-shared memory and the ability to pre-emptively transmit shared state, thereby avoiding compute-intensive identification (e.g., by assuming shared state exists on the target hosts). VMFork allows shared state to be assumed across the cluster without wasting resources and without constant hash-based comparisons that consume processing resources.

Although references are made throughout the description of the Figures to "powered-on" or "powered-off" VMs, it is understood that operations which are made can be made in either configuration, unless it is expressly stated that the operation cannot be performed in the alternate configuration.

Figure 4:
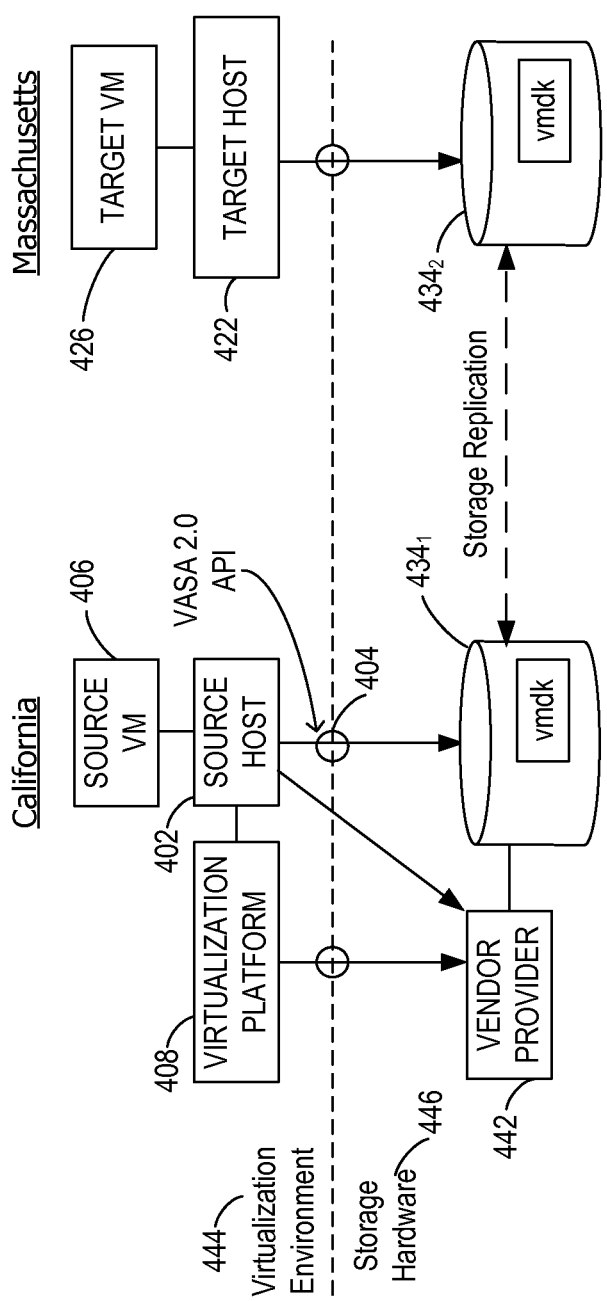
FIG. 4 is a block diagram of an example system utilizing live migration of a source VM to a target VM.

FIG. 4 is a block diagram of a system utilizing the disclosed method to migrate a child VM 311 and/or 312 from a source host 402 to a target host 422. In general, the system may include the source host 402 and multiple target hosts (not illustrated), although the child VM 311 and/or 312 is fully migrated to the target host 422, and not to all of the target hosts. In the proactive phase of the present disclosure, the shared memory blocks of the powered-on parent VM template 310 and the child VM 311 and/or 312 are migrated from the source host 402 to all of the target hosts. However, in the reactive phase of the present disclosure, the unshared memory blocks of the child VM 311 and/or 312 are migrated to the selected target host, alone.

Although in FIG. 4 only the source VM 406 is illustrated, it is understood that the source VM 406 is both the powered-on parent VM template 310 and the child VM 311 and/or 312. When the present disclosure is operating in the proactive phase, the source VM 406 is the powered-on parent VM template 310. Once the present disclosure moves into the reactive phase, the source VM is the child VM 311 and/or 312. Throughout the disclosure, references to the source VM are understood to be to both the powered-on parent VM template 310 and the child VM 311 and/or 312 depending on which phase of the disclosure is detailed.

Each host contains, for example, a processor and a memory area. One or more VMs may be contained within the memory area of each host. In the example of FIG. 4, the source host 402 is located in California and the target host 422 is located in Massachusetts; however, the hosts may be located anywhere. In some examples, the source host 402 and target host 422 communicate directly with each other. The source host 402 and target host 422 also communicate with their respective storage disks 434, such as storage disk 4341 and storage disk 4342, respectively, through an application programming interface (API) 404. The storage disks 434 may be one of any number of examples that are locally or remotely accessible, including a virtual storage array, NFS, VMFS, VVOL, and vSAN. The storage disks may be accessible through a network. In some examples, such as in FIG. 6, the storage disks 434 are managed by a vendor provider (VP) 442.

Collectively, a virtualization platform 408, the source VM 406 and target VM 426, and the source host 402 and target host 422 may be referred to as a virtualization environment 444. The APIs 404 represent the interface between the virtualization environment 444 and storage hardware 446. The storage hardware 446 includes the VP 442 and the storage disks 434 of the source VM 406 and the target VM 426.

In the example of FIG. 4, the source VM 406 is located on the source host 402, and the target VM 426 is located on the target host 422. The source host 402 and target host 422 communicate directly, in some examples. In other examples, the source host 402 and target host 422 communicate indirectly through the virtualization platform 408. Storage disks 434, in the illustrated example, are managed by VPs 442, or other array providers, that allow shared access to the storage disks 434 (e.g., VVOLs). The storage disks 434 illustrated in FIG. 4 are maintained by one of the VPs 442. In this example, the source host 402 and target host 422 communicate with the storage disks 434 through a network.

Aspects of the disclosure contemplate a policy-based driver mechanism to replicate and instantiate the powered-on parent VM template 310 on each target host, for example each hypervisor in a cluster. In some examples, VMs are provisioned using a VMFork-based strategy that involves maintaining, essentially, a powered-on parent VM template 310 in memory on each target host in a cluster and every cluster on the hybrid cloud where VMs may be migrated. The parent VM image is specific to each OS type. For example, if a cluster is used for Linux, Windows 7, and Windows 2008R2, three generic parent VM images are available on each host, in some examples.

This memory overhead is taken into account for planning purposes so the sum of memory allocations for each VMFork parent VM is deducted from projections for the memory available to working VMs. Because live migration of child VMs 311 and/or 312 (e.g., using vMotion from VMware, Inc.) presumes logical attachment of unique memory pages to an identical parent VM image on the target host, the VMFork powered-on parent VM template 310 is replicated from the source host 402 on which it was prepared and suspended onto all target hosts.

Creating separate VMFork parents on each target host will not work because each parent VM will be slightly different and will not be able to logically bind their shared pages to children from other hosts. Instead, aspects of the disclosure boot up a parent VM on one host (e.g., the source host 402), get the parent VM to a state for suspending, and copy the powered-on parent VM template 310 image to each hypervisor of the other hosts in the cluster or target hosts in the remote clusters containing target vMotion hosts (e.g., via vMotion) to create replicas on those target hosts. The suspended child VM 311 and/or 312 may then be resumed on any host in the cluster because all VMFork parent VMs on the cluster will be identical. Likewise, child VMs 311 and/or 312 may be migrated to any target host with an identical powered-on parent VM template 310 resident in memory. Aspects of the disclosure contemplate a policy-based driver mechanism to replicate and instantiate the powered-on parent VM template 310 on each of the hypervisors in the cluster or to clusters of hosts or hosts at remote datacenters.

Figure 5:
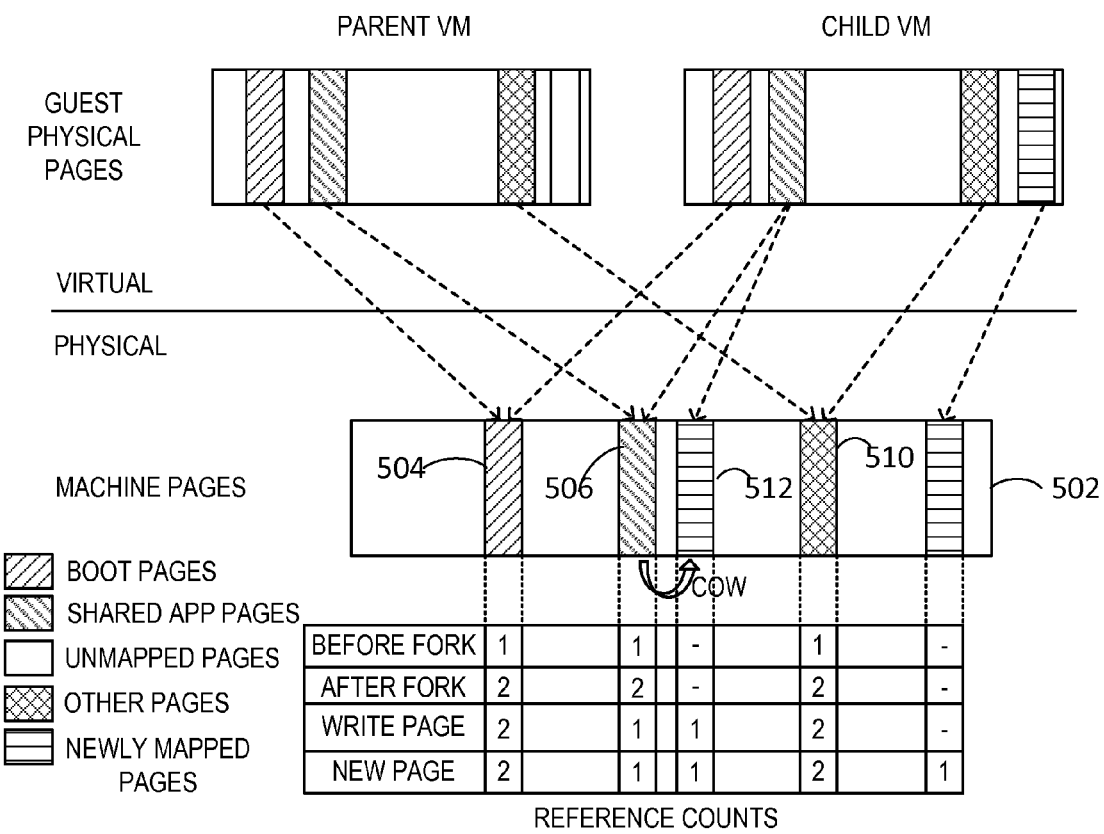
FIG. 5 is a block diagram illustrating the interrelation between example forked child and parent VMs and their associated storage.

FIG. 5 is a block diagram illustrating the usage of a powered-on parent VM template 310 and child VM 311 and/or 312 of common and exclusive machine pages. The relationship of the virtual and physical aspects of the disclosure are represented. A powered-on parent VM template 310 and a powered-on child VM 311 reside in the virtual space. Both the powered-on parent VM template 310 and a powered-on child VM 311 access machine pages 502 that are located on physical storage 307.

Five types of regions are illustrated on the machine pages 502. The first type of machine pages 502 illustrated are boot pages 504 (illustrated with lines slanting upwards from left to right). Shared application pages 506 (shared app pages) are illustrated with lines slanting downwards from left to right. Unmapped pages are illustrated by white area on the representation of the parent VM. The unmapped pages are represented, in this example, only on the powered-on parent template VM template 310. In other examples, unmapped pages may also be illustrated on the powered-on child VM 311. However, since they are unmapped, unmapped pages are not illustrated on the machine pages 502. Other pages 510 created by the VMs are illustrated by crosshatches. Newly mapped pages 512 are illustrated by horizontal lines.

FIG. 5 illustrates the sharing of common pages between the powered-on parent VM template 310 and the powered-on child VM 311. In the example of FIG. 5, before the powered-on child VM 311 is created (also referred to as "before fork") the only existing pages are the boot pages 504, shared application pages 506, and other pages 510. The only VM that is using those pages is the powered-on parent VM template 310, so the "reference counts" for those pages is 1. The powered-on parent VM template 310 is then forked, creating a powered-off child VM 312, which is executed to create the powered-on child VM 311. After the fork occurs, two VMs point to the boot pages 504, the powered-on parent VM template 310 and the powered-on child VM 311. Likewise, both the powered-on parent VM template 310 and the powered-on child VM 311 point to the shared application pages 506 and the other pages 510 after the fork. Consequently, each of these pages has a reference count of 2, in this example, as both the powered-on parent VM template 310 and the powered-on child VM 311 are pointing to them. In another example, there could be more reference counts to these pages if more powered-on child VMs 311 are executed.

After forking, but before creating any new content, the powered-on child VM 311 has no independent pages, but rather relies on the stored pages on the parent VM disk 314. The computing device 304 tags, marks, configures, or otherwise indicates that persistent storage 307 and/or disk 314 of the parent VM is COW. Tagging the persistent storage 307 and/or disk 314 and memory 308 of the powered-on parent VM template 310 as COW prevents the parent VM from modifying persistent storage 307 and/or disk 314 or memory 308 that the powered-on child VM 311 is relying upon. Instead, if the powered-on parent VM template 310 attempts to modify either persistent storage 307 or memory 308, a copy of that data is created for the powered-on parent VM template 310 leaving the original persistent storage 307 or memory 308 intact.

Once the powered-on child VM 311 writes, it creates its own copy of a page, a copy on write (COW) version of that page. In the example of FIG. 5, the child VM writes to the shared application pages 506, thus creating a COW page, the newly mapped page 512 in the figure. Once this new write has occurred, the powered-on parent VM template 310 still points to the shared application pages 506, but the powered-on child VM 311 now points to its newly mapped page 512. FIG. 5 reflects that after the COW pages are created, the powered-on child VM 311, in this example, does not point to the shared application pages 506 of the powered-on parent VM template 310, and thus the reference count for the shared application pages 506 drop to 1. The reference counts for the newly mapped pages 512 increase to 1, since the powered-on child VM 311 created that new page and now points to it. The reference counts for the boot pages 504 and the other pages 510 remain at 2, since in the example illustrated both the child VM 311 and the powered-on parent VM template 310 still point to those pages.

After the powered-on child VM 311 has created a newly mapped page 512, the powered-on child VM 311 writes that page to the physical machine pages 502. After that newly mapped page 512 is written, there is one reference to it, by the powered-on child VM 311. In the example of FIG. 5, there are two newly mapped pages 512 created.

The first newly mapped page 512 is a modification of an existing page stored by the powered-on parent VM template 310. In some examples, the newly mapped page 512 points back to the shared application pages 506 which it modifies, and only the changes made by the powered-on child VM 311 to the shared application pages 506 are recorded on the newly mapped pages 512. In other examples, the powered-on child VM 311 no longer relies on the powered-on parent VM template 310 for the modified shared application pages 506, and instead the powered-on child VM 311 only utilizes its newly created page.

The second newly mapped page 512 is original content created by the powered-on child VM 311. That newly mapped page 512 does not indicate that it is a modification of any previously existing page. Instead, that newly mapped page 512 is solely tied to the powered-on child VM 311, and only the powered-on child VM 311 references it, in some examples.

In the proactive phase of the present disclosure, the memory blocks which are shared between the powered-on parent VM template 310 and the child VM 311 and/or 312 are migrated to a plurality of target hosts under the methods disclosed and illustrated by FIGS. 7A through 7D. In the example illustrated in FIG. 5, the boot pages 504, the shared app pages 506, and the other pages 510 are shared by both the powered-on parent VM template 310 and the child VM 311 and/or 312. Only these memory blocks are migrated, because these memory blocks are common to both the powered-on parent VM template 310 and the child VM 311 and/or 312.

In the reactive phase of the present disclosure, after a target host is selected and the command to fully migrate the child VM 311 and/or 312 is received, the memory blocks which are unique to the child VM 311 and/or 312 are migrated. In the example illustrated in FIG. 5, the newly mapped pages 512 are the only memory blocks unique to the child VM 311 and/or 312. Therefore, the newly mapped pages 512 are migrated during the reactive phase of the present disclosure. In some examples, the newly mapped pages 512 are COW pages, modified memory blocks from the powered-on parent VM template 310. In other examples, the newly mapped pages 512 are new pages created by the child VM 311 and/or 312.

Figure 6A:
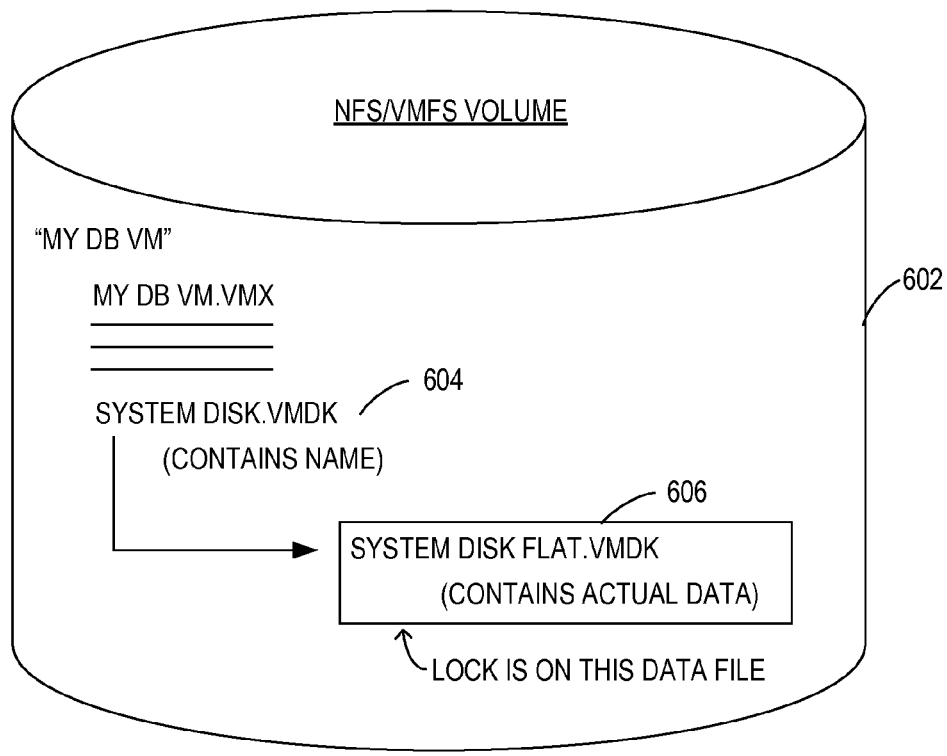
FIG. 6A is a block diagram of an example disk lock structure for a network file system (NFS) or virtual machine file system (VMFS) volume.
Figure 6B:
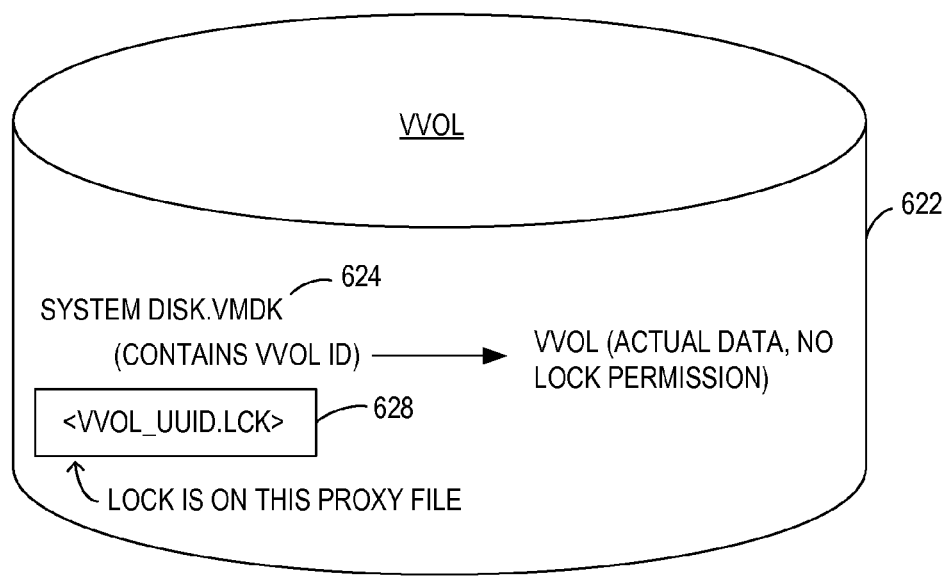
FIG. 6B is a block diagram of an example disk lock structure for a virtual volume (VVOL).
Figure 7A:
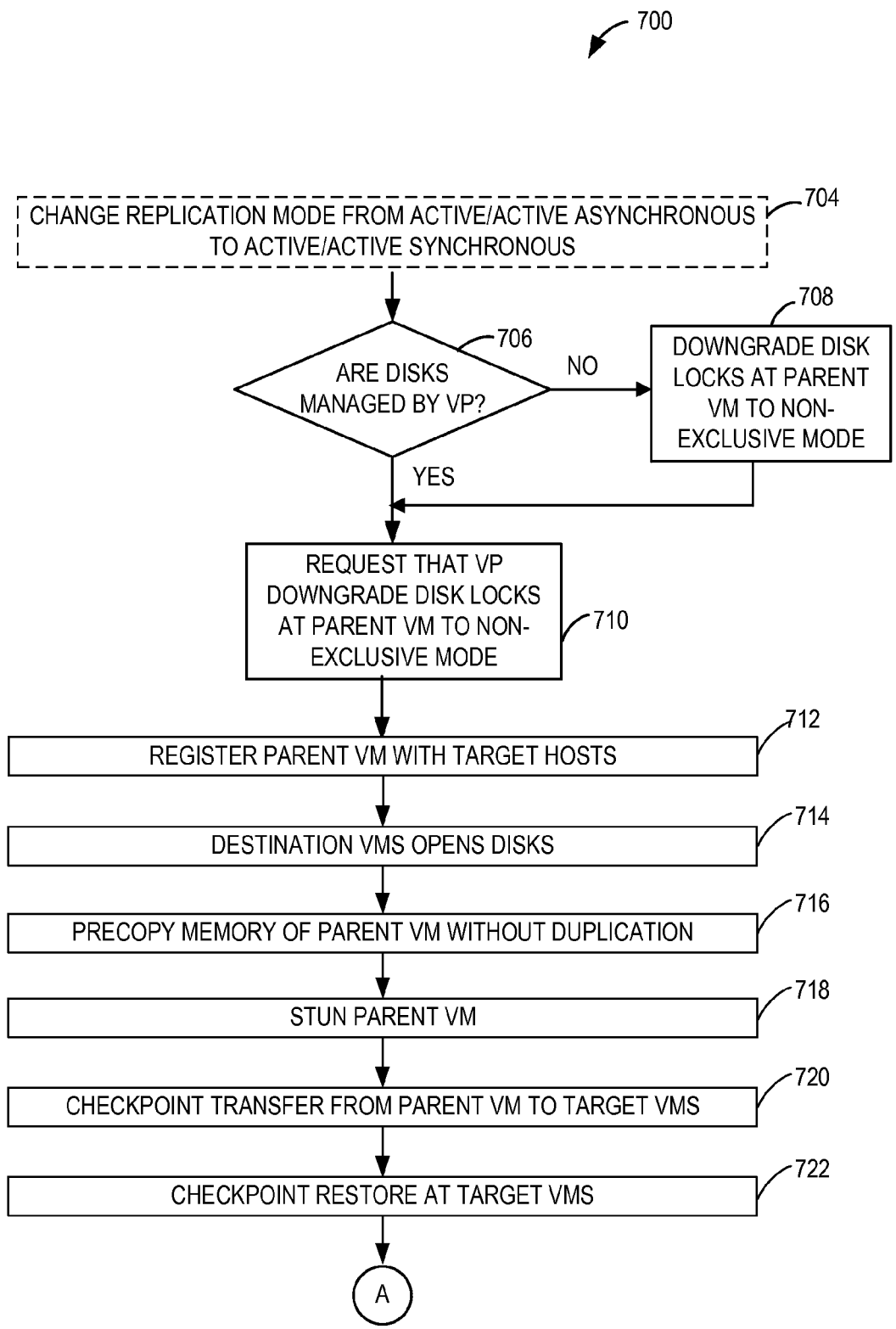
FIGS. 7A through 7D are flowcharts of an example method of migrating a child VM to a target VM utilizing a two-stage process.
Figure 7B:
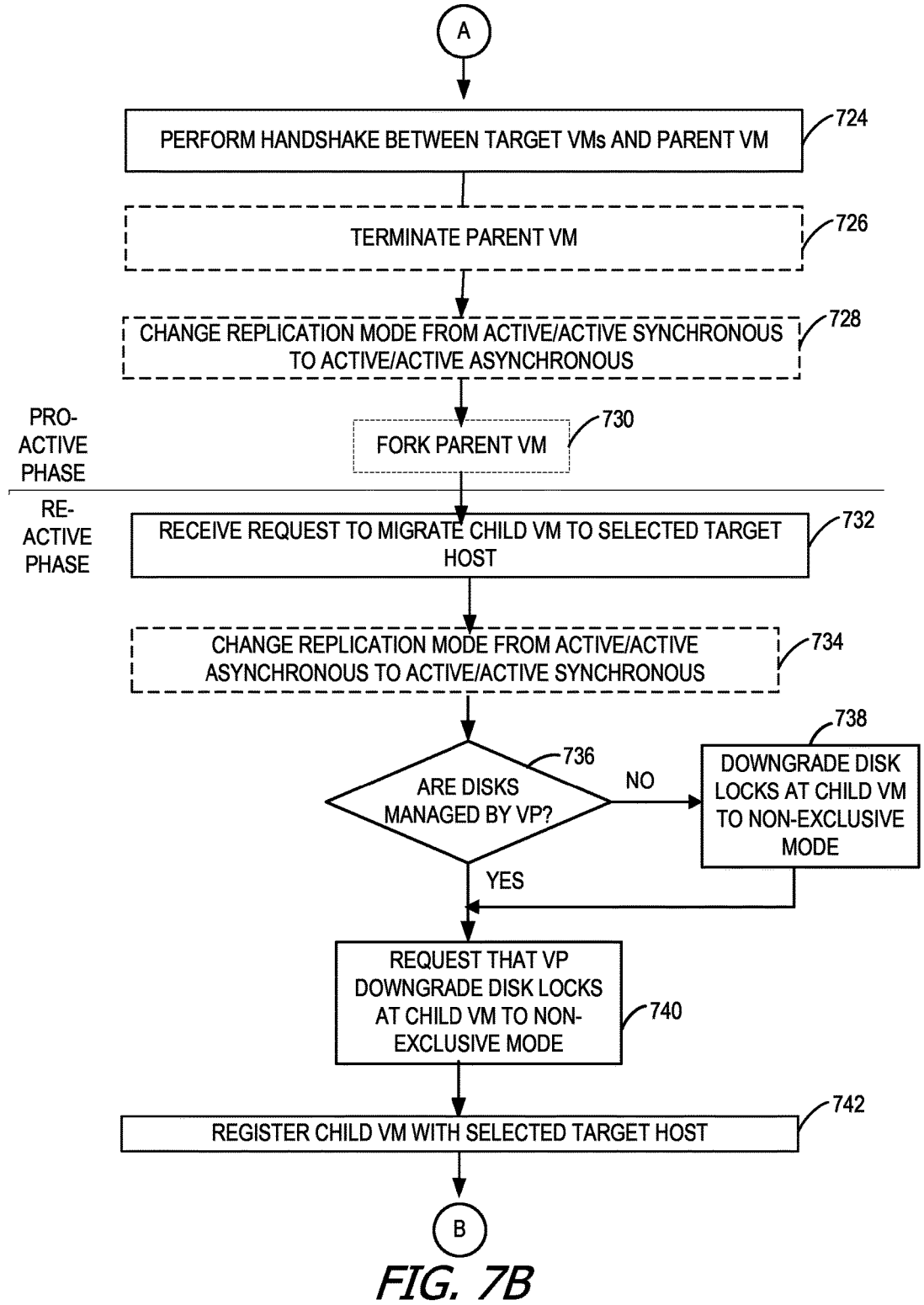
Figure 7C:
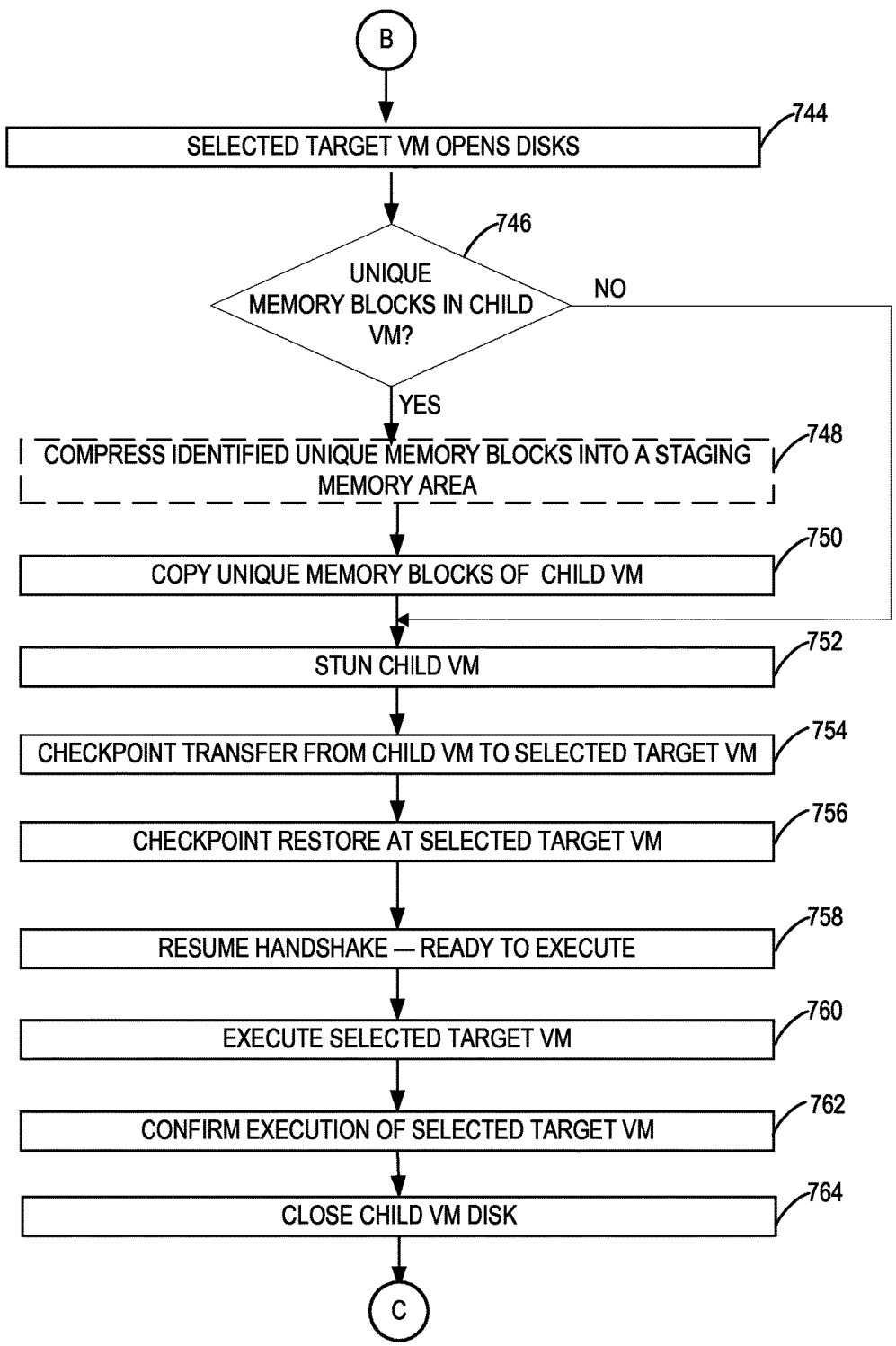
Figure 7D:
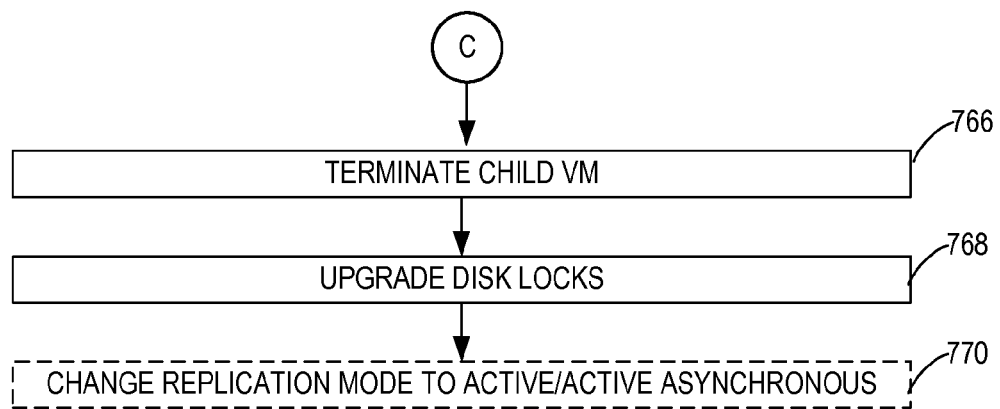

FIG. 6A is a block diagram of an example disk lock structure for a network file system (NFS) or VM file system (VMFS) 602. FIG. 6B is a block diagram of an example disk lock structure for a virtual volume (e.g., VVOL 622). Depending on the type of disk associated with the host VM, the locking mechanism may be changed and/or downgraded by the host in various manners.

For example, locking is different for VVOL 622 versus NFS/VMFS 602. In NFS/VMFS 602, the systemdisk.vmdk 604 contains the name of the system, and points to a flat file (e.g., data containing file) such as systemdiskflat.vmdk 606. The locks are placed on the flat file itself (e.g., the extent).

For VVOLs 622, the systemdisk.vmdk 624 contains a VVOL_ID which points to the VVOL backend and to a lock file such as VVOL_UUID.lck file 628. UUID refers to universally unique identifier, in some examples. For VVOLs 622, the lock is not on the backend data itself (e.g., VVOL) which has no lock primitives, but instead on the proxy file VVOL_UUID.lck file 628.

As described herein, the target VM 426 opens disks 434 prior to the source VM being stunned (e.g., the target VM 426 pre-opens the disks 434), with the target VM 426 taking exclusive ownership of the disks 434 after completion of the migration. The process of locking and unlocking is common to both source VMs. However, it is also possible that the disks 434 associated with the system are not locked. While some examples are described herein with reference to shared disk locks, .lck files, and the like, the disclosure contemplates any form of shared disks 434—with or without locks. Some examples do not take any locks against the disks 434 (e.g., VVOL .lck files) and/or do not create new .lck files for the target VM 426. In these examples, the disclosure is operable with shared disks 434, but unshared disk locks (e.g., there are no disk locks). Aspects of the disclosure are operable with any mechanism for taking exclusive ownership of the disk and/or any mechanism allowing the target VM 426 to open the disks 434.

Each VVOL 622, in some examples, is provisioned from a block based storage system. In an example, a NAS (network attached storage) based storage system implements a file system on top of data storage units (DSUs) and each VVOL 622 is exposed to computer systems as a file object within this file system.

In general, VVOLs 622 have a fixed physical size or are thinly provisioned, and each VVOL 622 has a VVOL_ID (identifier), which is a universally unique identifier that is given to the VVOL 622 when the VVOL 622 is created. For each VVOL 622, a VVOL database stores, for each VVOL 622, the VVOL_ID, the container ID of the storage container in which the VVOL 622 is created, and an ordered list of <offset, length> values within that storage container that comprise the address space of the VVOL 622. The VVOL database is managed and updated by a volume manager, which in an example, is a component of a distributed storage system manager. In an example, the VVOL database also stores a small amount of metadata about the VVOL 622. This metadata is stored in the VVOL database as a set of key-value pairs, and may be updated and queried by computer systems via an out-of-band path at any time during existence of the VVOL 622. Stored key-value pairs fall into three categories, in some examples. The first category is well-known keys (e.g., the definition of certain keys, and hence the interpretation of their values, are publicly available). One example is a key that corresponds to the virtual volume type (e.g., in virtual machine examples, whether the VVOL 622 contains the metadata or data of a VM). Another example is the App ID, which is the ID of the application that stored data in the VVOL 622. The second category is computer system specific keys (e.g., the computer system or its management module stores certain keys and values as the metadata of the virtual volume). The third category is storage system vendor specific keys. These allow the storage system vendor to store certain keys associated with the metadata of the virtual volume. One reason for a storage system vendor to use this key-value store for its metadata is that all of these keys are readily available to storage system vendor plug-ins and other extensions via the out-of-band channel for VVOLs 622. The store operations for key-value pairs are part of virtual volume creation and other processes, and thus the store operations are reasonably fast. Storage systems are also configured to enable searches of virtual volumes based on exact matches to values provided on specific keys.

FIGS. 7A through 7D are flowcharts of an example method 700 of live migration of a child VM from a source host to a selected target host utilizing a two-step process. While method 700 is described with reference to execution by a processor, or a hypervisor contained on the source host 402, it is contemplated that method 700 may be performed by any computing device. Further, execution of the operations illustrated in FIGS. 7A through 7D are not limited to a VM environment, but is applicable to any multi-source, multi-destination environment. Additionally, while the claim language is drawn to migration of a single VM from a host to a destination, it is understood that the method may likewise be utilized for migration of multiple VMs. Also, one or more computer-readable storage media storing computer-executable instructions may execute to cause a processor to implement the live migration by performing the operations illustrated in FIGS. 7A through 7D.

The operations of the example method of 700 are carried out by a processor associated with the child VM 311 and/or 312. The hypervisor 210 coordinates operations carried out by the processors associated with the source host 402 and target host 422 and their associated VMs. FIGS. 7A through 7D, described below, illustrates the sequence of the following events.

Optionally, at 704, the VP 442 switches and/or changes the replication mode from active/active asynchronous to active/active synchronous (or "near synchronous" or "approximately asynchronous" in some examples). In some examples, this change in operating environment is in response to notification from a virtualization software implementing a virtualization platform 408 or environment, such as VMware, Inc.'s VirtualCenter invokes an API, such as part of API 404 (e.g., PrepareForBindingChange( )). In some examples the replication mode may already be active/active asynchronous when the VP 442 issues the request. In some examples, the VP 442 also drains queued replication data I/O as necessary. This call blocks further I/O commands for as long as needed to switch the replication state to be synchronous. The PrepareForBindingChange( ) API function call, or other function call, is issued against the shared storage disk 434 of the source VM 406. Switching from asynchronous replication to synchronous replication during the live migration ensures that any writes to the child VM 311 and/or 312 that occur during the live migration are duplicated by the target VM 426. Aspects of the disclosure ensure that the underlying replication solution flushes whatever writes are occurring synchronously to the replica LUN/disk/storage (e.g., storage disk 434). The target VM 426, in some examples, does not actually issue duplicate I/O commands.

At 706, the management of the disks is evaluated. It is determined whether the disks are managed by VP 442 at 706. If the disks of the source VM 406, which at this stage is the powered-on parent VM template 310, are not managed by a VP 442, with the workload of the source VM 406 still running, the powered-on parent VM template 310 changes and/or downgrades its disk locks from exclusive locks to multiwriter (e.g., shared) disk locks and/or non-exclusive mode at 708. If the disks of the powered-on parent VM template 310 are managed by a VP 442, at 710, the hypervisor requests that the VP 442 change and/or downgrade the disk locks of the powered-on parent VM template 310 to non-exclusive mode.

In another example, the disk locks may be changed and/or downgraded to an authorized user status. The authorized users may be established as the source VMs 406 (both the powered-on parent VM template 310 and the child VM 311 and/or 312) and the target VM 426. This operation is omitted in the event that there are no locks on the disks 434. This may occur any time prior to stunning the powered-on parent VM template 310. In some examples, the powered-on parent VM template 310 sends a message to the target VM 426 that multiwriter mode is available for the disks 434 to be migrated. In some examples, the target VM 426 is instructed not to write to the disks 434.

At 712, an instance of the powered-on parent VM template 310 is created or registered at and/or with the target host 422. In order to register the powered-on parent VM template 310, the powered-on parent VM template 310 shares its configuration, including information regarding its disks 434. For example, the new instance of the powered-on parent VM template 310, registered at the target host 422, points to the replicated read-only disk content on the disk 434 of the powered-on parent VM template 310.

After the powered-on parent VM template 310 is registered at the target host 422 at 712, the newly created target VM 426 binds and opens all disks 434 in non-exclusive mode (e.g., multiwriter) lock mode at 714. The destination VMS opens disks at 714. At 716, the memory of the powered-on parent VM template 310 is pre-copied from the source host 402 to the target host 422. For example, ESXi servers, using the vMotion network, pre-copy the memory state of the powered-on parent VM template 310. This may take anywhere from seconds to hours. Pre-copying is complete when the memory at the target VM 426 is approximately the same as the memory at the powered-on parent VM template 310. Any form of memory copy is contemplated. The disclosure is not limited to pre-copy. Further, the memory copy may be performed at any time, even post-switchover. Only memory which is not already present at the target host 422 is copied. In some examples, some of the identified blocks to be pre-copied are compressed, while some remain uncompressed. In examples where compression occurs selectively, identified memory blocks are compressed, for example, based on system and usage restraints, or based on protocols defined by the user 108.

The powered-on parent VM template 310 is stunned, frozen, or otherwise suspended at 718. Stunning freezes or otherwise suspends execution of the powered-on parent VM template 310, but does not quiesce the powered-on parent VM template 310, in some examples. For example, no cleanup or shutdown operations normally associated with quiescing are performed. In some examples, suspending a process includes removing the process from execution on the kernel, or otherwise stopping execution of the process on the OS. For example, while execution of the process is halted, the process is not terminated or otherwise deleted from memory.

The duration of the suspended execution, in some examples, is about one second. Several operations may be performed during this duration or interval:

A. Any remaining dirty memory state is transferred from the powered-on parent VM template 310 to the target VM 426. This may be performed as part of a checkpoint transfer, at 720.

B. The target VM deserializes its virtual device checkpoint (e.g., checkpoint restore).

Once stunned, at 720, the virtual device state of the powered-on parent VM template 310 is serialized for transmission to the target VM 426. Serializing the virtual device state of the powered-on parent VM template 310 on the source host 402, in some examples, includes closing disks 434 (e.g., VM file systems, logical unit numbers, etc.) and releasing exclusive disk locks. These operations are often collectively referred to as checkpoint transfer. The virtual device state includes, for example, memory, queued input/output, the state of all virtual devices of the powered-on parent VM template 310, and any other virtual device side memory.

Upon receipt of the information in the checkpoint transfer, the target VM 426 engages in a checkpoint restore at 722. For example, the target VM 426 restores the virtual device state of the powered-on parent VM template 310 at the target VM 426, once the VP 442 indicates that the disks 434 have been opened successfully in multiwriter mode for the target VM 426. However, there is no need to open the disks 434 at this point because that occurred earlier at 714.

In some examples, the target VM 426 then transmits an explicit message to the powered-on parent VM template 310 that the target VM 426 is ready to start executing at 724. The powered-on parent VM template 310, in this example, replies with a Resume Handshake at 724. A handshake is performed between the target VM 426 and the parent VM template 310. In other examples, the powered-on parent VM template 310 sends a message to the target VM 426 confirming receipt of the message from the target VM 426. In another example, the processor (e.g. processor queries and updates both the source and the destination VMs for status reports regarding the checkpoint transmission and restoration.

After the handshake between the target VM 426 and the powered-on parent VM template 310 at 724, the powered-on parent VM template 310, in some examples, may terminate at 726. In other examples, the powered-on parent VM template 310 continues to run. If the powered-on parent VM template 310 terminates or closes, that includes releasing its multiwriter disk locks. The target VM 426, with the workload already running and issuing disk I/O, transparently changes and/or upgrades its locks from multiwriter to exclusive ownership.

Optionally, at 728, the replication mode is changed from active/active asynchronous to active/active synchronous (or "near synchronous" or "approximately asynchronous" in some examples). In some examples, this change in operating environment is in response to notification from a virtualization software implementing a virtualization platform 408 or environment, such as VMware, Inc.'s VirtualCenter invokes an API, such as part of API 404 (e.g., PrepareForBindingChange( )). In some examples, the replication mode may already be active/active asynchronous when the VP 442 issues the request. In some examples, the VP 442 also drains queued replication data I/O as necessary. This call blocks further I/O commands for as long as needed to switch the replication state to be synchronous. The PrepareForBindingChange( ) API function call, or other function call, is issued against the shared storage disk 434 of the source VM 406, which in this phase is still the powered-on parent VM template 310. Switching from asynchronous replication to synchronous replication during the live migration ensures that any writes to the powered-on parent VM template 310 that occur during the live migration are duplicated by the target VM 426. Aspects of the disclosure ensure that the underlying replication solution flushes whatever writes are occurring synchronously to the replica LUN/disk/storage (e.g., storage disk 434). The target VM 426, in some examples, does not actually issue duplicate I/O commands.

In some examples, the powered-on parent VM template 310 is forked at 730. Since the powered-on parent VM template 310 is resident on the target hosts, it is optionally forked either before or after migration of the memory blocks associated with the powered-on parent VM template 310. This operation is the conclusion of the proactive phase of the disclosure.

At 732, a request is received to migrate a child VM 311 and/or 312 to a selected target host. The selected target host is selected from amongst all of the target hosts based on some criteria. The criteria, in some examples, is hardware based. For instance, the criteria may be relative processing power of the target hosts. In other examples the criteria is based on bandwidth considerations: the selected target host may have a greater bandwidth for transmission and receipt of memory blocks. The criteria may be defined by users 108, or administrators. The criteria is, in some examples, established by the hypervisor.

The request to migrate the child VM 311 and/or 312 is considered a triggering event. The triggering event may be, for example, in response to a request from a user 108, or an administrator. In other examples the request for migration of the child VM 311 and/or 312 may be in response to changes in hardware or software availability and capability. For example, a target host may have more processing resources available than the source host 402 does, or the child VM 311 and/or 312 may be requested by multiple users. As further examples, the source host 402 and/or source VM 406 is live migrated for backup purposes, in order to make it more accessible to a different user 108. Requests for live migration are, in some examples, periodic, or otherwise occurring at regular intervals. In other examples, requests for live migration are made during system downtime, when I/O commands fall below a threshold amount established, for instance, by users 108. In other examples, requests for live migration are in response to system conditions such as anticipated hardware upgrades, downtimes, or other known or predicted hardware or software events.

The selected target host is chosen from the plurality of target hosts 422. In some examples, a target host 422 is selected based on various criteria. In one example, a target host 422 is manually selected by a user. In another example, a target host 422 is automatically selected based on a predetermined policy, algorithm, proactive resource management component, auction model, and/or any other mechanism that enables the target host 422 to function as described herein. Although not illustrated in FIG. 4, the selected target host will be identified as selected target host 422. This operation begins the reactive phase of the disclosure. In some examples, multiple child VMs 311 and/or 312 are migrated to one or more target hosts 422.

Optionally, at 734, the VP 442 switches and/or changes the replication mode from active/active asynchronous to active/active synchronous (or "near synchronous" or "approximately asynchronous" in some examples). In some examples, this change in operating environment is in response to notification from a virtualization software implementing a virtualization platform 408 or environment, such as VMware, Inc.'s VirtualCenter invokes an API, such as part of API 404 (e.g., PrepareForBindingChange( )). In some examples the replication mode may already be active/active asynchronous when the VP 442 issues the request. In some examples, the VP 442 also drains queued replication data I/O as necessary. This call blocks further I/O commands for as long as needed to switch the replication state to be synchronous. The PrepareForBindingChange( ) API function call, or other function call, is issued against the shared storage disk 434 of the source VM 406, which at this point is the child VM 311 and/or 312. Switching from asynchronous replication to synchronous replication during the live migration ensures that any writes to the child VM 311 and/or 312 that occur during the live migration are duplicated by the target VM 426. Aspects of the disclosure ensure that the underlying replication solution flushes whatever writes are occurring synchronously to the replica LUN/disk/storage (e.g., storage disk 434). The target VM 426, in some examples, does not actually issue duplicate I/O commands.

At 736, the management of the disks is evaluated. It is determined whether the disks are managed by VP 442 at 736. If the disks of the child VM 311 and/or 312 are not managed by a vendor provider (VP) 442, with the workload of the child VM 311 and/or 312 still running, the child VM 311 and/or 312 changes and/or downgrades its disk locks from exclusive locks to multiwriter (e.g., shared) disk locks and/or non-exclusive mode at 738. If the disks of the child VM 311 and/or 312 are managed by a VP 442, at 740 the hypervisor requests that the VP 442 change and/or downgrade the disk locks of the child VM 311 and/or 312 to non-exclusive mode.

In another example, the disk locks may be changed and/or downgraded to an authorized user status. The authorized users may be established as the source VMs 406 (both the powered-on parent VM template 310 and the child VM 311 and/or 312) and the target VM 426. This operation is omitted in the event that there are no locks on the disks 434. This may occur any time prior to stunning the child VM 311 and/or 312. In some examples, the child VM 311 and/or 312 sends a message to the target VM 426 that multiwriter mode is available for the disks 434 to be migrated. In some examples, the target VM 426 is instructed not to write to the disks 434.

At 742, an instance of the child VM 311 and/or 312 is created or registered at the selected target host 422. In order to register the child VM 311 and/or 312, the child VM 311 and/or 312 shares its configuration, including information regarding its disks 434. For example, the new instance of the child VM 311 and/or 312, registered at the selected target host 422, points to the replicated read-only disk content on the disk 434 of the child VM 311 and/or 312.

After the child VM 311 and/or 312 is registered at the selected target host 422 at 742, the newly created target VM 426, which is now the selected target VM (not illustrated), binds and opens disks 434 in non-exclusive mode (e.g., multiwriter) lock mode at 744.

At 746, the memory blocks of the child VM 311 and/or 312 are compared to the memory blocks of the powered-on parent VM template 310. The unique blocks of the child VM 311 and/or 312 are isolated. In some examples, the unique blocks will be the COW blocks created by the child VM 311 and/or 312. The unique blocks of the child VM 311 and/or 312 are any memory blocks not shared with the powered-on parent VM template 310, as illustrated in FIG. 5. In the example of FIG. 5, the newly mapped pages 512 would be identified as unique blocks.

It is determined at 746 whether child VM 311 includes unique memory blocks. If no unique blocks are identified, then the sequence moves to operation 752. If unique blocks are identified, they may optionally be compressed into a staging memory area at 748. In some examples, some of the identified blocks are compressed, while some remain uncompressed. In examples where compression occurs selectively, identified memory blocks are compressed, for example, based on system and usage restraints, or based on protocols defined by the user 108. Upon a request for any of the retrieved memory blocks, if they are compressed, the compressed memory blocks are decompressed. In some examples, all of the retrieved memory blocks are compressed. In alternative examples, none of the retrieved memory blocks is compressed. Alternatively, some memory blocks are compressed and the remainder are uncompressed. In some examples, the blocks are compressed at a fixed rate. In other examples the blocks are decompressed at a variable rate. For instance, the compressed blocks are decompressed based on frequency of use. Alternatively, decompression is a function of available resources, or decompression is, in some examples, performed in accordance with an algorithm.

When memory blocks are compressed, any memory page accessed upon completion of the live migration automatically decompresses and the rest of the memory pages may be decompressed in the background but without holding up VM execution, in some examples. The majority of memory pages on the selected target host 422 may already remain uncompressed because they belong to the powered-on parent VM template 310 which sits in memory uncompressed. In some models built based on observation of VDI sharing ratios, there are 90% of memory pages remaining shared with the VMFork powered-on parent VM template 310. On a 1 GB powered-on parent VM template 310, this means that only 100 MB of data is unique and would need to be transferred on the WAN during a long distance live migration, for instance utilizing vMotion by VMWare, Inc. Compression of this dataset may reduce it to 40 MB which, in some examples, may be transferred rapidly on the hybrid cloud resource grid. Additional WAN deduplication technologies may also be used, in some examples, to complement the data reduction strategies described here. Examples of such WAN optimization technology include vTO WAN optimization virtual appliance by VMware, Inc., or third party commercial solutions.

At 750, the unique memory of the child VM 311 and/or 312 is copied from the source host 402 to the selected target host 422. For example, ESXi servers from VMware, Inc., using the vMotion network, copy the memory state of the child VM 311 and/or 312. This may take anywhere from seconds to hours. Any form of memory copy is contemplated.

In some examples, upon receipt of all unique memory pages, the hypervisor registers the migrated VM in the local virtual center. In some examples, ESX performs the registration, (in the case of long distance vMotion) or in the local vCenter in the case of regular vMotion. The resulting VM instantiated on the selected target host 422 is a new VMFork child whose memory pages are comprised of the standard pointers to each memory page of the powered-on parent VM template 310, which now exists on the selected target host 422, plus the unique memory pages transferred from the source host 402 and which take precedence over the shared pages of the powered-on parent VM template 310 at the same memory location.

The child VM 311 and/or 312 is stunned, frozen, or otherwise suspended at 752. Stunning freezes or otherwise suspends execution of the powered-on parent VM template 310, but does not quiesce the child VM 311 and/or 312, in some examples. For example, no cleanup or shutdown operations normally associated with quiescing are performed. In some examples, suspending a process includes removing the process from execution on the kernel, or otherwise stopping execution of the process on the OS. For example, while execution of the process is halted, the process is not terminated or otherwise deleted from memory.

The duration of the suspended execution, in some examples, is about one second. Several operations may be performed during this duration or interval:

A. Any remaining dirty memory state is transferred from the child VM 311 and/or 312 to the target VM 426. This may be performed as part of a checkpoint transfer, at 754.

B. The target VM deserializes its virtual device checkpoint (e.g., checkpoint restore).

Once stunned, at 754 the virtual device state of the child VM 311 and/or 312 is serialized for transmission to the target VM 426. Serializing the virtual device state of the child VM 311 and/or 312 on the source host 402, in some examples, includes closing disks 434 (e.g., VM file systems, logical unit numbers, etc.) and releasing exclusive disk locks. These operations are often collectively referred to as checkpoint transfer. The virtual device state includes, for example, memory, queued input/output, the state of all virtual devices of the child VM 311 and/or 312, and any other virtual device side memory.

Upon receipt of the information in the checkpoint transfer, the target VM 426 engages in a checkpoint restore at 756. For example, the target VM 426 restores the virtual device state of the child VM 311 and/or 312 at the target VM 426, once the VP 442 indicates that the disks 434 have been opened successfully in multiwriter mode for the target VM 426. However, there is no need to open the disks 434 at this point because that occurred earlier at 744.

In some examples, the target VM 426 then transmits an explicit message to the child VM 311 and/or 312 that the target VM 426 is ready to start executing at 758. The child VM 311 and/or 312, in this example, replies with a Resume Handshake. In other examples, the child VM 311 and/or 312 sends a message to the target VM 426 confirming receipt of the message from the target VM 426. In another example, the processor (e.g. processor queries and updates both the child VM 311 and/or 312 and the selected target VM for status reports regarding the checkpoint transmission and restoration.

After the handshake between the selected target VM 426 and the child VM 311 and/or 312 at 758, the selected target VM 426 begins executing at 760. At 762, the selected target VM 426 confirms that it has executed. The child VM 311 and/or 312 terminates at 766. If child VM 311 and/or 312 terminates or closes, that includes releasing its multiwriter disk locks at 764. The selected target VM 426, with the workload already running and issuing disk I/O, transparently changes and/or upgrades its locks from multiwriter to exclusive ownership at 768.

In some examples, the process of cleanup occurs. This includes invoking another of APIs 404 (e.g., CompleteBindingChange( ) that allows the storage vendor to reverse the environment changes made above. The VP 442 reverts replication to operating asynchronously (e.g., active/active asynchronous), and may change replication direction or bias and restore an original recovery point objective (RPO) at 770.

Each VM is comprised of a static set of shared pages plus a growing set of unique memory pages. For any given vMotion target host, the static set of shared pages can be moved prior to the need to perform the actual vMotion operation and need be performed only once per host. By proactively moving the VMFork parent's memory image to set of possible target hosts ahead of vMotion requests, only the set of unique memory pages need be moved during the actual vMotion event (e.g., responsive to a migration request or decision). For child VMs such as virtual desktop infrastructure (VDI) desktops with as little as 10% unique memory pages, only 200 MB may need to be migrated rather than 2 GB, in some examples. In some examples, high performance compression algorithms may further reduce this by at least 50% by compressing these memory pages (e.g., using ESX's built in memory compression format) which allows for decompression to proceed on-demand once the VM is fully migrated to the target host. In the context of long distance vMotion, there is an opportunity to move the parent VM's memory image to a set of ESX hosts located at one or more hosting facilities where a company may wish to subsequently move their VMFork based VMs. This 'heavy lifting' portion of setup may be done at off-peak hours to minimize the impact of the heavy transfer. Later on when there is a need, request, and/or decision to migrate a child VM within the hybrid cloud, only unique memory pages need be moved and logically attached to the already present parent VM image.

By radically reducing the amount of data that must be moved on the WAN, much smaller WAN networks become viable for VM migration on a grid of hybrid cloud resources. The transactional overhead is reduced both in cost of WAN consumption and in time to complete the migration operation. This 'order of magnitude' level of reduction in transactional overhead broadens the value of geo-optimization, opening the door to advanced policy driven migration strategies that lower cost of execution while maintaining workload specific service level agreements (SLAs). This capability facilitates revenue models such as charging small commission fees for VM migrations on the hybrid cloud within the context of cost reducing geo-optimizations. VMFork based provisioning in tandem with VMFork aware vMotion form the backbone of these new advanced hybrid cloud optimization opportunities.

Aspects of the disclosure dramatically reduces the amount of data that must be transferred when live-migrating a virtual machine from one datacenter to another. The traditional vMotion operation copies full memory state of the virtual machine from one hypervisor to another. In the case of long-distance migrations this may result in the need to transfer many gigabytes of data. The examples described herein may reduce this data by as much as 90% in many cases through a combination of logical deduplication achieved by leveraging VMFork's knowledge of shared versus unique blocks and compression.

Aspects of the disclosure reduce the bandwidth required for migration to a bare minimum. Aspects of the disclosure reduce the cost of long distance migrations to a level where are considered modest compared to the overall cost reductions achievable with policy based migrations.

Aspects of the disclosure enable economically driven migrations that enable VMs to execute at a location where resources corresponding to their needs are priced advantageously.

Aspects of the disclosure reduce the amount of data processing on the host, increase the speed of the host and other devices, reduce an amount of data being transferred during live migration, improve the functioning of the host itself, use less memory for the same set of VMs, reduce power consumption (use of memory takes power), reduce processor load, reduce network bandwidth usage, improve operating system resource allocation, and/or increase efficiency.

VMFork aware vMotion includes focus on both the COW memory page transfer and also the linked-clone transfer for long-distance vMotion. Similarly, the parent VM storage image and the parent VM memory image can be transferred before the event. To vMotion a child VM, the linked-clone and the memory image are transferred to the remote datacenter in some examples, except in examples where synchronous replication is in play.

Replication

While the present disclosure allows for a change to the replication environment, alternative replication environments are available, and replication may occur continuously in order to facilitate a more rapid migration upon demand. Replication copies the data associated with a VM from one location to another (e.g., from one host to another host) for backup, disaster recovery, and/or other purposes. Replication can occur every hour, nightly, continuously, etc. There are several types of replication. In active/active replication, both hosts have access to their respective copies of the VM. That is, the active/active nature of replication ensures that both sides can concurrently write to the replicated storage without issue.

Further, replication can be synchronous or asynchronous. Synchronous replication requires round-trips on the write path, whereas asynchronous replication does not. Each party, in some examples, can freely write to disk. Aspects of the disclosure are operable with any mechanism (e.g., locking, generation number tracking, etc.) that ensures that one can, in a distributed manner, determine where the latest version of any given item of data is stored.

In active/active synchronous replication, one host notifies the other host of a planned data write and provides the data to be written, and both hosts perform the write at the same time. There may be significant latency involved to coordinate the write operations in this way, especially over long distances.

In active/active asynchronous replication, one host notifies the other host of a planned data write and asks whether that host has a dirty copy of the data block to be written (e.g., an updated version of the data block). If the other host has a dirty copy of that data block, the data block is synchronized and then the data write is performed by both hosts. In this manner, both hosts coordinate their writes to ensure that they do not write to the same data block without first checking to make sure they have the most updated version of the data block.

In active/passive replication, only one side can write to their copy of the VM. In this manner, one host is considered active and the other host is considered passive. The active host is able to write to its copy of the VM, whereas the passive host is not able to initiate writes to its copy of the VM as the passive host merely maintains a copy of the VM. In the event of failure of the active host, the passive host becomes the active host and resumes execution of the VM.

Replication may be described in some examples at the VM level (e.g., replication of VMs, or a subset of the disks of the VMs), such as in Host Based Replication (HBR) and/or vSphere Replication. Alternatively or in addition, replication may be described at a deeper level, with reference to logical unit numbers (LUNs), a group of LUNs in a consistency group, and/or the like. In general, aspects of the disclosure are operable with replication in which at least one host writes to a LUN (which backs one or more of the disks of a VM) on one site, with another host at another site leveraging the replicated LUN content.

Various methods of replication may be leveraged to ensure that the proactive phase of the present disclosure is complete at the time a request for live migration is received. For example, the parent VM templates may be replicated through active/passive replication to all target hosts, continuously. In that example, when a request for live migration is anticipated the replication environment may be altered.

Example Revenue Models

Aspects of the disclosure contemplate various revenue models for determining where to place the shared data and when to place the shared data. For example, aspects of the disclosure contemplate proactive resource management (e.g., resource scheduling, load balancing, etc.) and/or an auction model to determine where it will be cheapest to execute a VM based on its workload resource profile, and compare this to cost of moving the VM there.

Efficient long distance live migration of VMs allows platforms to advertise resources (e.g., in a marketplace) including a price for I/O, a price for storage per gigabyte, etc. This allows analysis of workload attributes of VMs (e.g., CPU, memory, etc.) to develop a workload profile, and then compare that to the advertisements from the host providers to choose a host provider by estimating cost over time and/or savings over time while factoring in movement costs.

Similar considerations are performed to determine when to migrate the shared data. For example, the migration may occur as part of a management operation when setting up a hybrid cloud operation. The migration may occur in response to manual input (e.g., manual selection of hosts) and/or the result of a policy-driven framework (e.g, algorithmic selection). Some policy examples include evaluating intermittently or regularly (e.g., weekly) to get a set of target hosts, calculating the costs of moving to those hosts, and the costs of storing at those hosts. One or more of the hosts may then be selected based on their calculations (e.g., select one or more hosts with the lowest costs). VMFork based child VMs used linked-clone' technology which allows for their parent VM's storage image to be transferred to any target host along with the parent VM's memory image. At the point of vMotion for child VMs based on VMFork, only the linked-clone file and the unique memory pages will need to be transferred to the target host. The data reduction on the WAN is thus two-fold and includes a reduction in the size of the live memory image and the storage blocks that define the child VM.

Example Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Example computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an example computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

The examples illustrated and described herein as well as examples not specifically described herein but within the scope of aspects of the disclosure constitute example means for performing live migration with memory state sharing. For example, the elements illustrated in the figures, such as when encoded to perform the operations illustrated in the figures, constitute example means for transferring one or more memory blocks from a parent VM to one or more target hosts, example means for receiving a request to migrate a child VM associated with the parent VM, example means for identifying one or more memory blocks in the child VM that are unique to the child VM, and example means for transferring the one or more identified memory blocks to the one or more target hosts.

At least a portion of the functionality of the various elements illustrated in the figures may be performed by other elements in the figures, or an entity (e.g., processor, web service, server, application program, computing device, etc.) not shown in the figures. While some of the examples are described with reference to products or services offered by VMware, Inc., aspects of the disclosure are operable with any form, type, origin, or provider of the products or services described.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:
1. A system comprising:
 a memory area associated with a computing device, said memory area storing memory blocks; and
 a processor programmed to:
  transfer one or more memory blocks from a parent virtual machine (VM) to one or more target hosts;

receive a request to migrate a child VM associated with the parent VM;

identify one or more memory blocks in the child VM that are unique to the child VM; and transfer the one or more identified memory blocks to the one or more target hosts.

2. The system of claim 1, wherein the processor is programmed to compress the one or more identified memory blocks before the one or more identified memory blocks are transferred to the one or more target hosts.

3. The system of claim 1, wherein the processor is programmed to compress the one or more identified memory blocks on a wide area network.

4. The system of claim 1, wherein the processor is programmed to:

transfer the one or more identified blocks to the parent VM on the one or more target hosts for execution thereon.

5. The system of claim 1, wherein the processor is programmed to:

receive a request to decompress a first portion of the one or more identified blocks;

selectively decompress the first portion of the one or more identified blocks during a first phase.

6. The system of claim 5, wherein the processor is programmed to decompress a second portion of the one or more identified blocks at a predetermined rate during a second phase.

7. The system of claim 1, wherein the processor is programmed to fork the child VM from the parent VM, the one or more memory blocks identified based on one or more activities associated with the child VM after being forked.

8. The system of claim 1, wherein the processor is programmed to:

halt an execution of a script at the parent VM; and resume execution of the script at the child VM, the one or more memory blocks identified based on the resumed execution of the script.

9. The system of claim 1, wherein the processor is programmed to monitor the child VM for a triggering event, the request to migrate the child VM received based on the triggering event.

10. The system of claim 1, wherein the processor is programmed to identify the one or more target hosts based on predetermined criteria.

11. A method for live migration with memory state sharing, said method comprising:

transferring one or more memory blocks from a parent virtual machine (VM) to one or more target hosts;

receiving a request to migrate a child VM associated with the parent VM;

identifying one or more memory blocks in the child VM that are unique to the child VM; and transferring the one or more identified memory blocks to the one or more target hosts.

12. The method of claim 11, further comprising compressing the one or more identified memory blocks on a wide area network before the one or more identified memory blocks are transferred to the one or more target hosts.

13. The method of claim 11, further comprising:

receiving a request to decompress a first portion of the one or more identified blocks;

selectively decompressing the first portion of the one or more identified blocks during a first phase.

14. The method of claim 13, further comprising decompressing a second portion of the one or more identified blocks at a predetermined rate during a second phase.

15. The method of claim 11, further comprising:

halting an execution of a script at the parent VM; and resuming execution of the script at the child VM, the one or more memory blocks identified based on the resumed execution of the script.

16. The method of claim 11, further comprising monitoring the child VM for a triggering event, the request to migrate the child VM received based on the triggering event.

17. The method of claim 11, further comprising identifying the one or more target hosts based on predetermined criteria.

18. One or more computer storage media including computer-executable instructions that, when executed, cause at least one processor to:

transfer one or more memory blocks from a parent virtual machine (VM) to one or more target hosts;

receive a request to migrate a child VM associated with the parent VM;

identify one or more memory blocks in the child VM that are unique to the child VM; and transfer the one or more identified memory blocks to the one or more target hosts.

19. The one or more computer storage media of claim 18, wherein the computer-executable instructions, when executed, cause at least one processor to compress the one or more identified memory blocks before the one or more identified memory blocks are transferred to the one or more target hosts.

20. The one or more computer storage media of claim 18, wherein the computer-executable instructions, when executed, cause at least one processor to:

selectively decompress a first portion of the one or more identified blocks during a first phase; and decompress a second portion of the one or more identified blocks at a predetermined rate during a second phase.

* * * * *